April 21, 1925.  
H. F. CONGABLE  
SPRINKLER  
Filed Feb. 8, 1922  
1,534,633

Inventor  
Henry F. Congable.

By Harry Schwed  
Attorney

Patented Apr. 21, 1925.

1,534,633

UNITED STATES PATENT OFFICE.

HENRY F. CONGABLE, OF OAKLAND, CALIFORNIA, ASSIGNOR TO ROBINSON HARDWARE COMPANY, OF OAKLAND, CALIFORNIA, A CORPORATION OF CALIFORNIA.

SPRINKLER.

Application filed February 8, 1922. Serial No. 535,075.

*To all whom it may concern:*

Be it known that I, HENRY F. CONGABLE, a citizen of the United States, residing at Oakland, in the county of Alameda and State of California, have invented certain new and useful Improvements in Sprinklers, of which the following is a specification.

My invention is an improved lawn spray which sprays the water more finely than the sprays now in use, and which is simple in construction and cheap to manufacture.

Referring to the annexed drawing in which my invention is illustrated and which forms a part of this specification:

Figure 1:
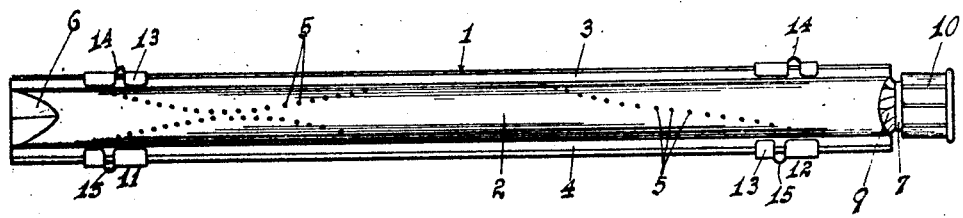
Figure 1 is a top plan view of my lawn spray.
Figure 2:
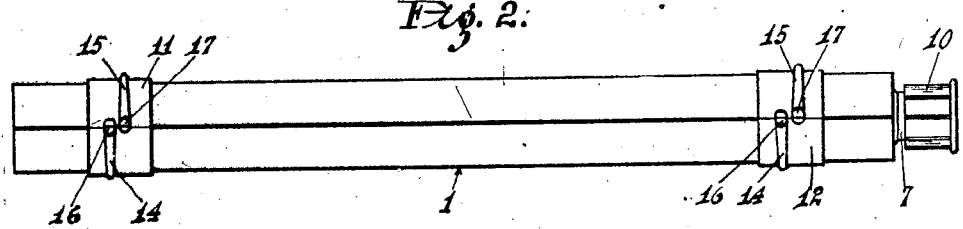
Figure 2 is a bottom plan view of my spray.

My lawn spray includes a V-shaped trough member 1 and an outwardly convex arcuate member 2 which is bent outwardly along its longitudinal edges. The trough member 1 is bent backwardly upon itself, forming longitudinal beads 3 and 4 in which the longitudinal edges of the member 2 are tightly fitted and soldered. Spray holes 5 are punched inwardly through the member so that the burr is on the inside instead of the outside of said member as in other sprays. The burr on the inside of the spray holes 5 causes the water to be sprayed more finely through said holes than when the burr is on the outside of the holes as in other sprays.

One end of the member 2 is crimped inwardly at 6 and soldered to the corresponding end of the member 1, closing said ends of said members. A nipple 7 is inserted between the other ends of the members 1 and 2 and said end of member 2 is crimped around said nipple at 9 and said ends of both members are soldered to the nipple thus holding the nipple in place. A hose coupling 10 screws on the end of nipple 10.

Figure 3:
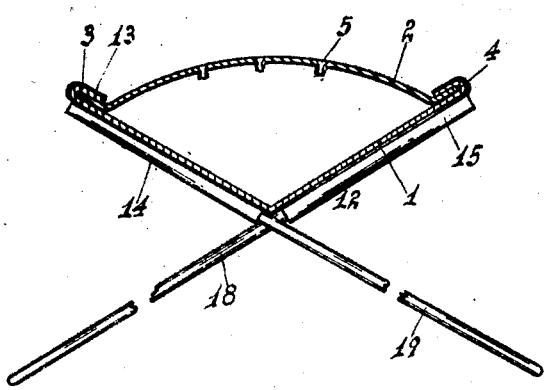
Figure 3 is a view of my lawn spray, partly in cross section and partly in elevation.
Figure 4:
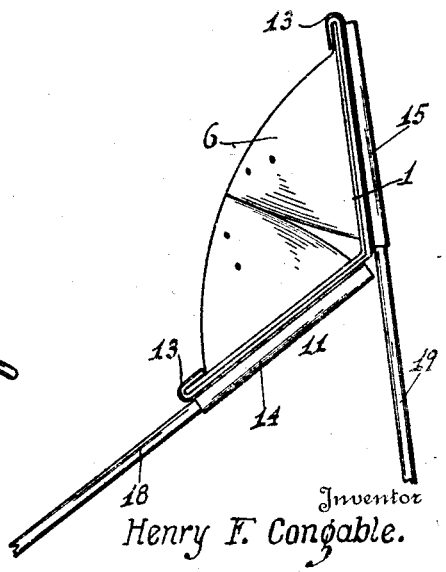
Figure 4 is an end elevation of my lawn spray with the rods 18 and 19 so adjusted as to cause my lawn spray to distribute water laterally.

Two V-shaped clips 11 and 12 fit on the spray near the ends thereof respectively, both clips being bent inwardly at their ends into flanges 13 which hook over the beads 3 and 4 whereby the clips are detachably mounted on the spray. Transverse external beads 14 and 15 are formed on the respective members of the clips 11 and 12 which beads are open at both ends; holes 16 and 17 being cut in the clips at the apex thereof to provide the openings at the inner ends of the beads 14 and 15. Supporting rods 18 and 19 are inserted in the beads 14 and 15. The rods project from the inner ends of the beads to support the spray with the member 2 and spray holes 5 uppermost to spray the water upwardly as shown in Figure 3. One of the rods, for example the rod 19, may be projected from the inner end of the bead so that the rods will support the spray with the member 2 and the spray holes 5 at one side to spray the water to one side as shown in Figure 4.

Having described my invention, I claim:

1. A lawn sprinkler comprising a tubular member having perforations therein for directing streams of water therefrom, a plurality of means on said member for slidably receiving a plurality of supporting rods whereby either of said supporting rods may be adjusted so that one of its ends may project from either end of one of said means to vary the position in which said tubular member may be supported.

2. In a lawn sprinkler, a longitudinally curved tubular member comprising a metallic bottom member shaped to provide a channel and a longitudinally curved top member connected at its sides to the channel-forming member, pairs of rods adjustably connected to said tubular member for supporting the latter in various positions relative to the surface of the ground, and V-shaped clips secured to said tubular member, said clips having parts forming connections between said pairs of rods and said tubular member.

In testimony whereof I affix my signature.

HENRY F. CONGABLE.